United States Patent
Winkley

(10) Patent No.: US 6,463,846 B2
(45) Date of Patent: *Oct. 15, 2002

(54) SNIPPER KNIFE ASSEMBLY HOLDER

(75) Inventor: Robert C. Winkley, Columbus, WI (US)

(73) Assignee: Hughes Company, Inc., Columbus, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/966,910

(22) Filed: Sep. 28, 2001

(65) Prior Publication Data

US 2002/0134251 A1 Sep. 26, 2002

Related U.S. Application Data

(63) Continuation of application No. 09/813,554, filed on Mar. 21, 2001, now Pat. No. 6,318,249.

(51) Int. Cl.⁷ .......................... A23N 15/00; A23N 15/12
(52) U.S. Cl. ............................. 99/636; 99/639; 99/643; 426/481
(58) Field of Search .......................... 99/635–643, 546; 366/222, 223, 225, 233; 83/858, 857, 403.1, 423, 856, 165, 662, 411.5; 426/481–483; 219/626, 664, 288, 296; 269/86, 87, 152, 216; 211/181.1; 403/187

(56) References Cited

U.S. PATENT DOCUMENTS

| | | |
|---|---|---|
| 1,400,290 A | 12/1921 | Johannes |
| 1,436,746 A | 11/1922 | Wolfe |
| 1,897,664 A | 2/1933 | Hansen |
| 2,114,730 A | 4/1938 | Urschel |

(List continued on next page.)

OTHER PUBLICATIONS

August Herbort–Braunschweig, Product Literature, High Capacity Bean Declustering Machine 74 R & High Capacity Bean Snipper Model 74 RA, Oct., 1975.

A.K. Robbins and Company, Inc., Robbins Food Processing Machinery Product Descriptions, CRCO Model BST Bean Snipper & CRCO Model 800 Unsnipped Bean Remover, undated.

Chisholm–Ryder Co. Inc., Product Literature Bulletin 6329, CRCO Models FHB, FHP and FHS Bean Snippers, Niagara Falls, New York, undated.

Photograph of snipper knife assembly believed to be in public use or on sale in this country for more than one year prior to the filing of the parent application, undated.

Primary Examiner—Timothy F. Simone
(74) Attorney, Agent, or Firm—Foley & Lardner

(57) ABSTRACT

A holder for mounting a knife assembly, e.g., as used in a bean snipper or similar device, to a mounting rod or similar structure. The holder includes first and second plate members which are moveably joined together at first ends thereof (e.g., in a hinged relation), and which are sized and shaped to contact the mounting rod at a plurality of points when closed together around the mounting rod such that the second ends of the plate members are brought together. A knife assembly, including a knife head and a knife rod, is attached to the knife holder by extending an end of the knife rod through knife rod apertures formed in one of the plate members until the end of the knife rod contacts a knife rod stop. The knife rod apertures position a portion of the knife rod adjacent to the mounting rod at a contact point. A tightening structure, such as a hand rotatable knob, is mounted on the second ends of the plate members, to bring the second ends together when the tightening structure is tightened, thereby pinching the mounting rod between the plate members while simultaneously pinching the knife rod between the plate member and the mounting rod, thereby to secure the knife assembly to the mounting rod.

11 Claims, 4 Drawing Sheets

U.S. PATENT DOCUMENTS

| | | |
|---|---|---|
| 2,376,062 A | 5/1945 | Kerr |
| 2,393,461 A | 1/1946 | Finley |
| 2,518,598 A | 8/1950 | Buck |
| 3,010,498 A | 11/1961 | Carlson |
| 3,304,974 A | 2/1967 | Urschel |
| 3,318,350 A | 5/1967 | Urschel |
| 3,378,051 A | 4/1968 | Grosbety |
| 3,885,697 A | 5/1975 | Urschel |
| 4,213,383 A | 7/1980 | Burton |
| 4,528,902 A | 7/1985 | Mietzel |
| 4,538,492 A | 9/1985 | Van Lue et al. |
| 4,981,073 A | 1/1991 | Zittel |
| 5,144,887 A | 9/1992 | Mietzel |

SNIPPER KNIFE ASSEMBLY HOLDER

This a continuation application of application Ser. No. 09/813,554, filed Mar. 21, 2001, now U.S. Pat. No. 6,318,249.

FIELD OF THE INVENTION

The present invention pertains generally to agricultural product processing methods and devices and, more particularly, to devices and methods for snipping the ends off of beans, and knife assemblies for use in such devices.

BACKGROUND OF THE INVENTION

Beans, such as green beans, as harvested have a central edible pod with blossom and stem ends. The ends of the beans are fibrous, and, therefore, are not tender and thus not palatable to consumers of the beans. Therefore, prior to canning or other packaging of such beans for marketing, it is essential to remove as many of the stem and blossom ends from the harvested beans as possible.

Specialized machines, known as bean snippers, have long been used to remove the ends from large quantities of harvested beans prior to canning or other packaging of the beans. A conventional bean snipper includes an elongated hollow drum which is rotatably mounted on a frame such that the drum extends in a generally horizontal direction with a bean input end of the drum elevated slightly with respect to the other output end thereof. A plurality of circumferentially extending slots are formed on the drum, extending through the drum from the interior to the exterior thereof. The slots are sized and shaped to allow the narrow ends of beans to protrude therethrough from the interior to the exterior of the drum, while preventing the beans themselves from falling out of the drum through the slots. The interior of the drum is divided by axially spaced apart partitions. The partitions within the interior of the bean snipper drum are spaced apart from each other by a distance which is slightly smaller than the typical length of the beans to be processed by the bean snipper, and include central apertures which allow beans to flow through the drum from the elevated input end thereof to the opposite output end thereof as the drum is rotated.

As the bean snipper drum is rotated, beans within the drum are lifted from the inside bottom of the drum and fall back into pockets formed between the partitions therein. The spacing of the partitions within the drum helps to direct the blossom and stem ends of the beans to protrude through the slots formed in the wall of the drum. A plurality of snipper knives are mounted on the outside of the drum, adjacent to the peripheral surface thereof. The snipper knives cut the non-tender blossom and stem ends, which protrude through the slots, from the beans as the drum rotates the slots past the snipper knives. In the random travel of beans from one end of the snipper drum to the other, as the drum is rotated, most of the beans in the drum will have each of their blossom and stem ends protrude through a slot, to be cut off by a snipper knife. Thus, the conventional bean snipper device described is highly effective in removing the undesirable ends from large quantities of beans. Various known devices and structures may be placed within the bean snipper drum to increase snipping efficiency.

Various different types of snipper knives are used in combination with the conventional bean snipper device described above to cut the bean ends which protrude from the slots formed in the drum from the beans. For example, bean snipper knives may be formed as elongated bands of steel having sharpened edges, or having several cutouts or openings with sharpened edges, which are mounted wrapped around the outer peripheral surface of the rotating bean snipper drum in a fixed position, as shown, for example, in U.S. Pat. No. 4,213,383. More commonly, a plurality of bean snipper knife assemblies are mounted adjacent to the outer peripheral surface of the bean snipper drum on a plurality of mounting rods which are attached to the bean snipper drum frame and which extend in an axial direction parallel to the outer surface of the drum. Such knife assemblies typically include a knife head attached to a resilient flexible means, such as a leaf spring or semi-flexible metal knife rod which, in turn, is attached to the mounting rod positioned external and parallel to the bean snipper drum by a knife assembly holder or bracket. The mounting rods on which the knife assemblies are mounted may be fixed or may be oscillated, thereby to oscillate the knife heads of the knife assemblies back and forth in an axial direction against the outer periphery of the bean snipper drum. If a sufficient number of banks of knife assemblies are provided, such that each slot formed in the drum will pass by the cutting edge of at least one knife head during rotation of the drum, maximum bean snipping efficiency can be achieved without requiring such oscillation of the knife assemblies. The knife heads employed in the knife assemblies may have various forms. For example, a bean snipper knife head may include several knives supported on a structure, such as a rigid bar. A more common knife head is triangular in shape, with two cutting edges formed thereon.

A typical knife assembly holder for attaching a knife assembly to a mounting rod is formed as a split cylindrical sleeve, made of metal or plastic, having semi-cylindrical complimentary parts which are positioned around the mounting rod positioned parallel to the snipper drum. The split cylindrical sleeve typically has lugs formed extending therefrom, through which screws, bolts, or other fasteners are used to join the two parts of the sleeve together to secure the sleeve to the mounting rod. Typically, a separate fastener or fasteners are used to secure the resilient flexible leaf spring or knife rod connecting the knife head to the knife assembly holder to the holder. For example, an aperture or clamping structure may be formed on one of the semi-cylindrical complimentary parts forming the split cylindrical sleeve of the holder and adapted to receive an end of a knife rod opposite to the end thereof which is attached to the knife head. A bolt, screw, or other fastener may be used to hold the end of the knife rod in position within the aperture or clamping structure. By properly adjusting the position of the split cylindrical sleeve holder on the mounting rod, and the position of the knife rod on the holder, a desired amount of pressure of the knife head against the snipper drum periphery may be achieved to ensure that the blades on the knife head remain in contact with the drum periphery for effective bean snipping, while minimizing damage to the drum by excessive pressure of the knife head against the rotating drum. A manual cam lever may be provided on the knife assembly holder to engage the knife leaf spring or rod to bow it towards the drum, thereby also to adjust the pressure of the knife head against the drum. Conventional bean snipper knife assemblies and holders therefor of this type are described and illustrated, for example, in U.S. Pat. Nos. 3,304,974, 3,318,350, 3,378,051, 3,885,697, 4,981,073, and 5,144,887.

Before operation of a conventional bean snipper, as described above, it is necessary to mount many snipper knife assemblies onto the mounting rods positioned along side the snipper drum. During operation of the snipper device, it is often necessary to replace worn knife heads and blades, and to adjust the position of the knife assemblies, e.g., to adjust the pressure of the knife head against the outer periphery of the drum, e.g., as the drum periphery and/or knife blades becomes worn, and/or has the resiliency of the leaf spring or knife rod which connects the knife head to the knife assembly holder changes. Such changes and adjustments during operation of the bean snipper device are typically performed in uncomfortable and often messy conditions. Often times, an operator must position himself at least partially under an operating bean snipper to make such adjustments. With a conventional knife assembly holder, e.g., employing split cylindrical sleeves having semi-cylindrical complementary parts held together by a plurality of fasteners, such as screws and bolts, and with separate fasteners for mounting the flexible leaf spring or knife rod connected to the knife head to the knife assembly holder, the process of removing, adjusting, and remounting a snipper knife assembly can take several minutes, and, typically, requires several tools, e.g., wrenches, pliers, screwdrivers, etc. Since a typical conventional bean snipper may have many such knife assemblies, e.g., thirty or more, mounted thereon, the total time spent removing, adjusting, and reattaching knife assemblies using conventional knife assembly holders in such a system, to maintain optimal bean snipping efficiency, can be significant.

What is desired, therefore, is a knife assembly holder and method which allows an operator of a bean snipper, or similar agricultural product processing device, to remove, adjust, and remount a knife assembly in a reduced amount of time, and, preferably, by hand, without the use of tools.

SUMMARY OF THE INVENTION

The present invention provides a holder for mounting a knife assembly, for use, e.g., in a bean snipper or similar agricultural product processing device, to a mounting rod or shaft, positioned adjacent to the device, easily, quickly, and securely. Preferably, a snipper knife assembly holder in accordance with the present invention may be attached to a mounting rod by hand, without the use of tools. A knife assembly holder in accordance with the present invention allows a knife assembly to be mounted on a mounting rod and adjusted in position thereon by an operator quickly and easily while a bean snipper or similar device with which the knife assembly is used is in operation.

A knife assembly holder in accordance with the present invention includes two complementary plate members. Each of the first and second complementary plate members has a first end and a second end. A structure is formed at the first end of each of the first and second plate members so as to allow the first ends of the first and second plate members to be moveably joined together, e.g., in a hinged relation. For example, the first end of the first plate member may include a tab formed thereon which extends into a corresponding slot formed on the first end of the second plate member, thereby to join the first and second plate members together in a hinged relation. The first and second plate members are shaped such that, when the first ends thereof are joined together, the plate members may be closed about the structure formed at the first ends thereof to bring the second ends of the plate members together, such that the joined plate members together form an opening which is sized so as to receive a mounting rod upon which the knife assembly holder is to be mounted. The opening thus defined by the two plate members, when closed together around a mounting rod, is sized and shaped such that an inner surface of each of the plate members contacts an outer surface of the mounting rod at a plurality of contact points.

A tightening structure is provided at the second ends of the plate members, where the second ends of the plate members come together. The tightening structure is adapted to pull the second ends of the first and second plate members together. For example, the tightening structure may be implemented as a hand turnable threaded knob which includes a threaded shaft which extends through apertures formed in the second ends of each of the plate members into the threaded aperture of a nut or other threaded structure formed or positioned on the second end of one of the plate members. As the hand turnable knob is threaded into the nut, or other structure, the second ends of the plate members are brought tightly together. When the plate members are positioned about a mounting rod to which a knife assembly is to be mounted, tightening of the threaded knob in this manner brings the second ends of the plate members together, thereby pulling the plate members tightly against the mounting rod at the plurality of contact points, thereby to mount the knife assembly holder securely to the mounting rod. A more conventional nut and bolt assembly without a hand turnable knob may be used to implement the tightening structure, although such a device would require the use of a wrench or other tool to tighten the plate members to the mounting rod.

A knife assembly, e.g., a snipper knife assembly for a bean snipper, or similar device, to be mounted to a mounting rod using a knife assembly holder in accordance with the present invention, includes a knife head, with sharpened knife edges formed thereon, mounted, e.g., on a resilient flexible knife rod. The knife assembly is mounted to the mounting rod using the knife assembly holder of the present invention by providing knife rod apertures through one of the knife assembly holder plate members. The knife rod of the knife assembly is inserted through the knife rod apertures. The knife rod apertures formed in the plate member are positioned thereon such that the knife rod of the knife assembly extends through the plate member in a direction perpendicular to the axis of the mounting rod upon which the knife assembly holder is mounted. A knife rod stop may be formed on the knife assembly holder which assists in positioning the knife rod to extend by a proper amount through the knife rod apertures. The knife rod apertures formed in the plate member are also positioned thereon such that, when the resilient knife rod is extended through the knife rod apertures of the plate member of a knife assembly holder mounted on a mounting rod, a portion of the resilient knife rod is positioned by the knife rod apertures adjacent to the mounting rod. On either side of this contact point between the resilient knife rod and the mounting rod, the resilient knife rod is in contact with a surface of the knife rod apertures formed in the plate member. As the tightening structure, mounted on the second ends of the plate members, is tightened, the plate member through which the knife rod apertures are formed is pulled toward the mounting rod on which the knife assembly holder is mounted, thereby pulling the resilient knife rod, captured in the knife rod apertures formed in the plate member, against the mounting rod at the contact point between the resilient knife rod and the mounting rod. This securely pinches the resilient knife rod between the apertures formed in the plate member and the mounting rod, thereby securing the knife assembly in a desired position.

The present invention thus provides a knife assembly holder for a bean snipper or similar agricultural product processing device which allows a snipper knife to be mounted to a bean snipper or other device, adjusted in position thereon, and removed therefrom, easily and quickly by employing a single tightening structure, such as a hand turnable threaded knob. A knife assembly holder in accordance with the present invention may be used to mount a snipper knife assembly to a mounting rod positioned adjacent to a bean snipper drum by simply closing the two plate members of the knife assembly holder about the structure formed on the first ends thereof around the mounting rod, such that the plate members contact the mounting rod at several contact points. The knife rod of a snipper knife assembly is then inserted through the knife rod apertures formed in one of the plate members, such that a portion of the knife rod is adjacent to the mounting rod. The knife rod stop ensures that the knife rod is extended through the knife rod apertures by the proper amount. The tightening structure, e.g., the hand turnable threaded knob, mounted on the second ends of the plate members, is then tightened, thereby bringing the second ends of the plate members together to both tighten the plate members themselves to the mounting rod as well as to pinch the knife rod securely between one of the plate members (at the knife rod apertures formed therein) and the mounting rod, thereby securely mounting the snipper knife assembly in position to the mounting rod. To adjust the position of the knife assembly, the single tightening structure, e.g., the threaded knob, is simply loosened, thereby releasing the pressure between the knife assembly holder plate members and the knife rod and the mounting rod, thereby allowing the two plate members forming the knife assembly holder to be rotated in position about the mounting rod, to, thereby, for example, adjust the amount of pressure of the knife edges formed on the head of the knife assembly against, e.g., the outer surface of the rotating drum of a bean snipper, or to allow the position of the knife assembly in the knife rod apertures to be adjusted, or to allow a new knife assembly to be inserted into the knife rod apertures. The tightening structure may then be tightened once again, to secure the knife assembly back into the desired position. To entirely remove a knife assembly holder from the mounting rod, the tightening structure, e.g., the hand turnable threaded knob, may simply be unthreaded from the second ends of the plate members, the knife assembly removed from the knife rod apertures, and the plate members opened about the structure formed at the first ends thereof, thereby to separate the second ends of the plate members such that the knife assembly holder may be removed from the mounting rod.

These and further objects, features, and advantages of the present invention will be apparent from the following detailed description, taken in conjunction with the accompanying drawings.

DETAILED DESCRIPTION OF THE INVENTION

The present invention provides a holder for mounting a knife assembly, used in a bean snipper or similar agricultural product processing apparatus, to a mounting rod or shaft. A knife assembly holder in accordance with the present invention is easily operable to quickly mount a knife assembly to a mounting rod, to adjust the position of the knife assembly, and to remove a knife assembly from an agricultural product processing device. The present invention will be described in detail herein with reference to the exemplary application thereof to a bean snipper device and a knife assembly employing a conventional triangular knife head. It should be understood, however, that a knife assembly holder in accordance with the present invention may be used in combination with other agricultural product processing devices employing knife assemblies of this type, such as, for example, a bean decluster cutter apparatus, which is used to decluster and snip beans before the beans are fed to a bean snipper, and employing different types of knife heads and blades.

Figure 1:
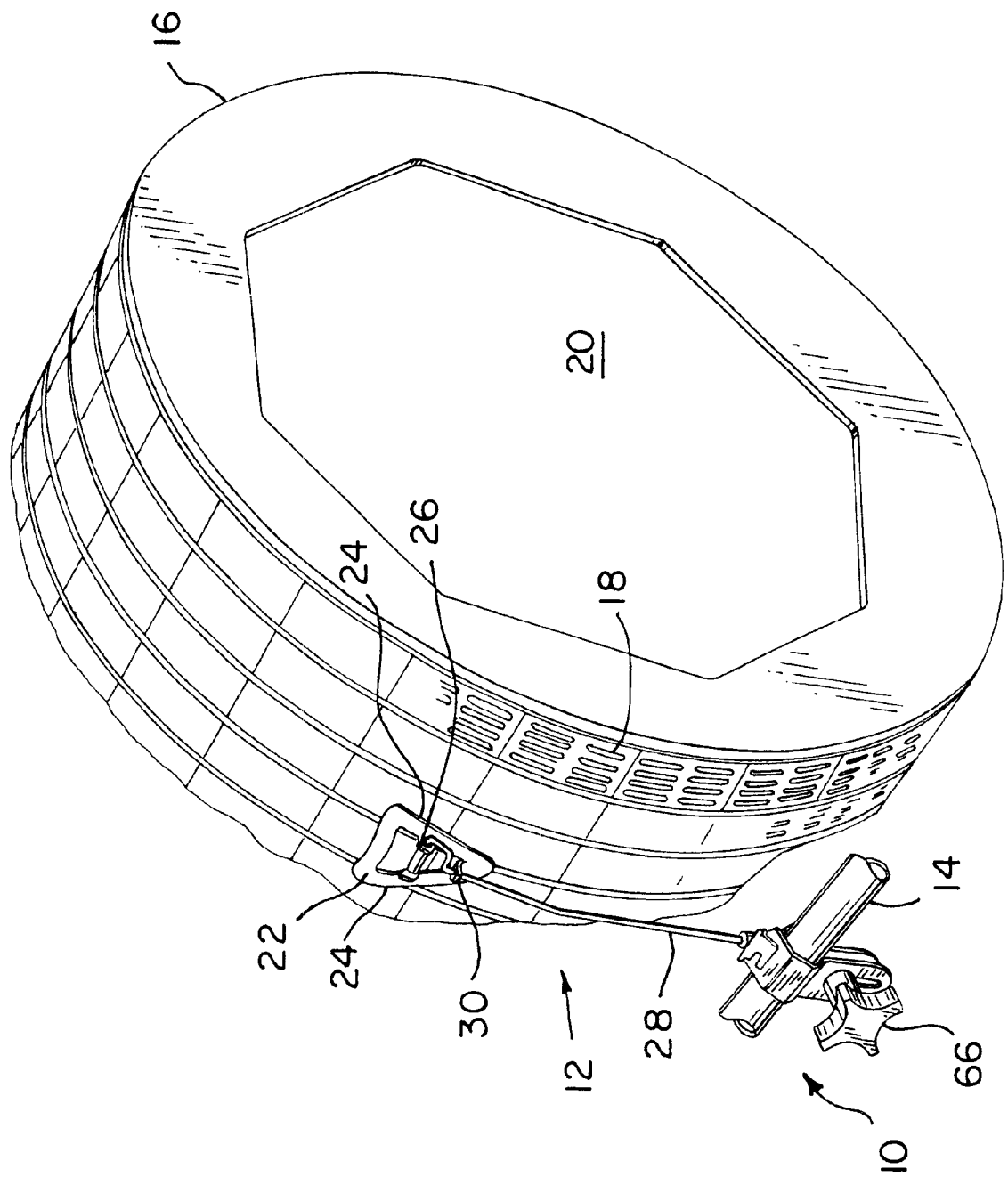
FIG. 1 is a perspective view of a portion of a bean snipper device showing a portion of a bean snipper drum and a snipper knife assembly mounted to a mounting rod positioned adjacent to the drum using an exemplary knife assembly holder in accordance with the present invention.
Figure 2:
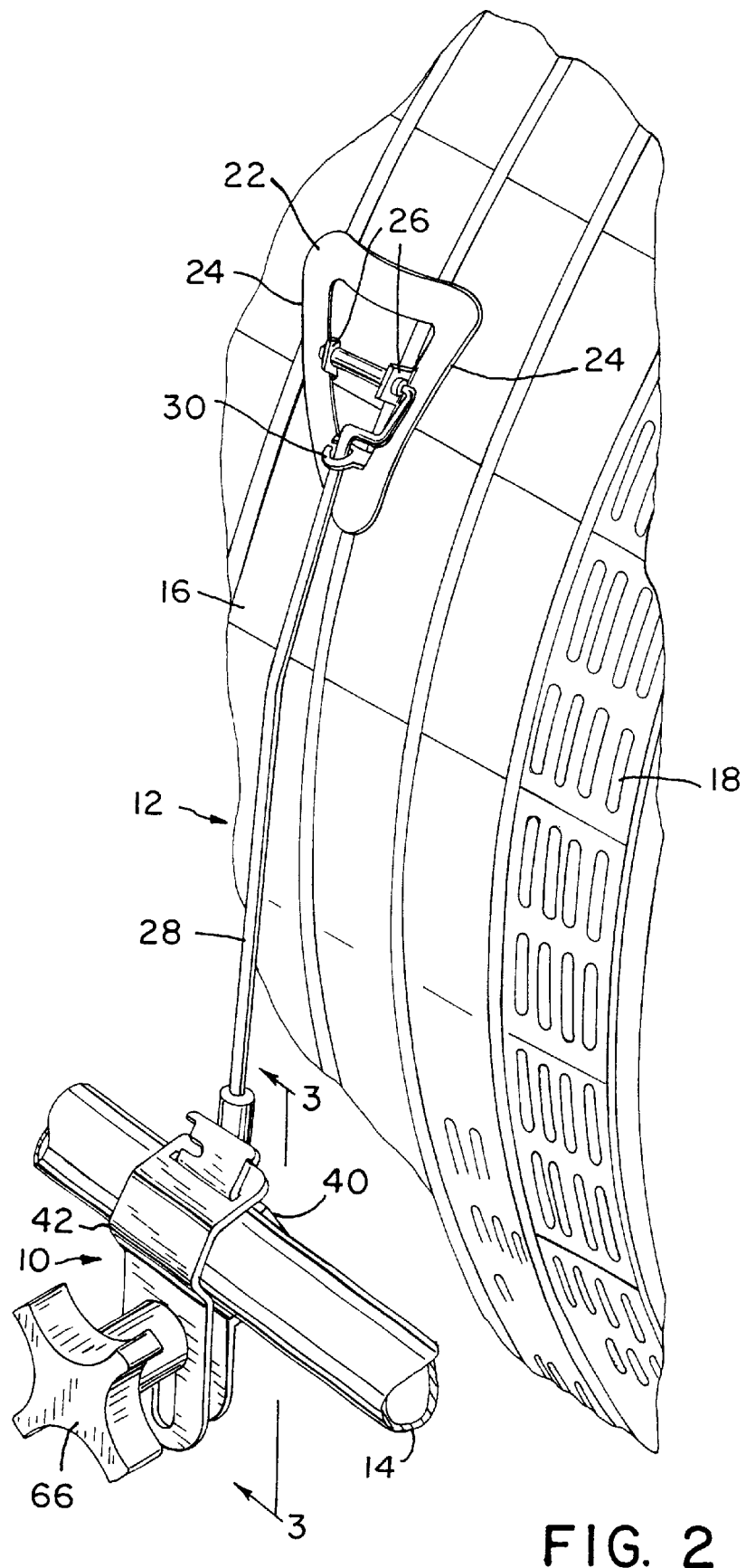
FIG. 2 is a more detailed perspective view of the knife assembly and knife assembly holder of FIG. 1.

An exemplary knife assembly holder 10 in accordance with the present invention is shown in use in FIGS. 1 and 2 for mounting a knife assembly 12 to a mounting rod 14 positioned adjacent to a bean snipper drum or cylinder 16. As described above, and as is known in the art, the bean snipper drum 16 is mounted for rotational movement on a frame (not shown) along with one or more of the mounting rods 14, which extend parallel to the bean snipper drum 16 near the outer peripheral surface thereof. Unsnipped beans are provided into an input aperture provided at one end of the inclined snipper drum 16. As the drum is rotated, unsnipped blossom and stem ends of the beans protrude through apertures 18 formed in the peripheral outer surface of the drum 16. (Note that the slots 18 formed in the outer surface of the drum 16 may be straight, as illustrated in FIGS. 1 and 2, or zigzag shaped. Straight slots allow more debris to fall from the drum 16 therethrough, whereas zigzag-shaped slots better hold beans in position for more efficient and clean snipping of the ends thereof. Note also that the slots 18 are typically formed to cover the entire outer peripheral surface of the snipper drum 16. For clarity, only a portion of the slots 18 are illustrated in FIGS. 1 and 2.) Bean ends protruding from the slots 18 are cut off by knife assemblies 12 mounted external to the drum 16 and adjacent thereto. (For exemplary purposes, only one knife assembly 12 is illustrated in FIGS. 1 and 2. Typically, many knife assemblies 12 will be mounted on each of a plurality of parallel mounting rods 14 mounted adjacent to the rotating bean snipper drum 16, such that a bean end protruding from any one of the slots 18 formed on the drum will be snipped by one or more knife assemblies 12 as the drum 16 is rotated.) Processed beans, with their blossom and stem ends snipped therefrom, exit through an open output end 20 of the inclined snipper drum for further processing. Various devices and techniques have been developed for improving the efficiency of bean snipping by appropriate design of the interior structure of the snipper drum 16. These techniques will be know to those skilled in the art, are not the subject of this application, and, therefore, are not described in further detail herein.

Each exemplary knife assembly 12 includes a knife head 22, which may, for example, be triangular in form, with two cutting edges 24 angularly disposed thereon. The knife head 22 is positioned against the outer surface of a bean snipper drum 16 such that the cutting edges 24 simultaneously pass over a plurality of the apertures 18 formed in the drum 16 as the drum rotates. Each knife assembly head 22 may have one or more projections or studs 26 formed projecting outwardly from adjacent its center, such projections extending generally radially with reference to the drum 16. One end of a resilient knife rod 28 is mounted for rotational movement to the studs 26 or other projections formed on the knife head 22. For example, one end of the resilient knife rod 28, which may be covered, for example, by a plastic sleeve, to reduce friction, may be inserted through apertures formed in the studs 26 or other structures formed extending from the knife head 22. This structure allows the knife head 22 to rotate with respect to the knife rod 28, thereby allowing the knife head 22 to adjust its position to follow the rotating surface of the bean snipper drum 16, against which the knife head 22 is placed. The resilient knife rod 28 extends from the end thereof which is attached to the knife head 22 through an apertured ear structure 30, also formed on the knife head 22. The apertured ear structure 30 serves to hold the knife head 22 upright when it is withdrawn from the peripheral surface of the bean snipper drum 16 (by limiting the rotation thereof with respect to the knife rod 28). The other end of the resilient knife rod 28, opposite the end thereof which is attached to the knife head 22, is mounted to the mounting rod 14 by the knife assembly holder 10 in accordance with the present invention.

Figure 3:
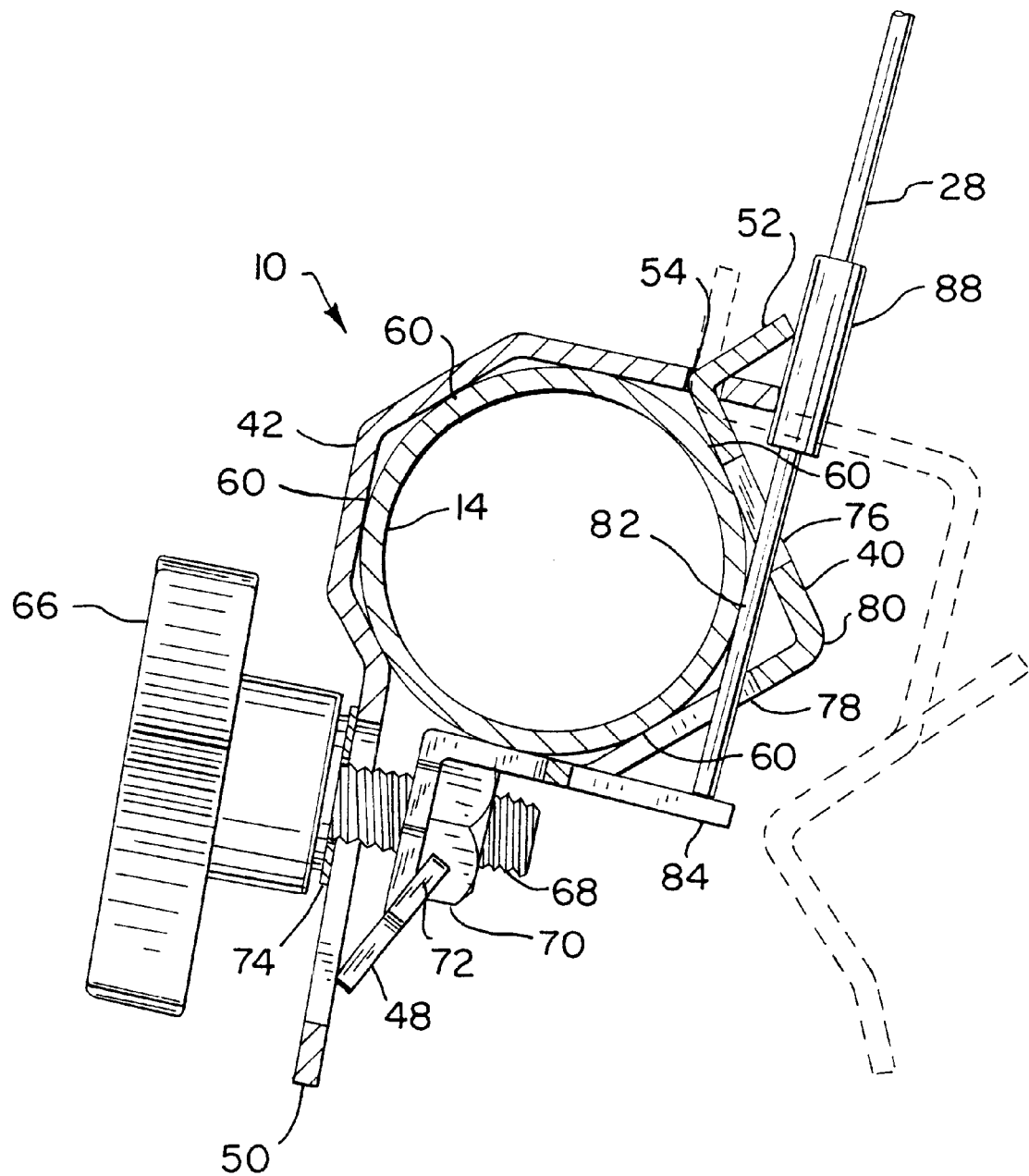
FIG. 3 is a more detailed partial cross-sectional view of an exemplary knife assembly holder in accordance with the present invention, as taken along line 3—3 of FIG. 2.
Figure 4:
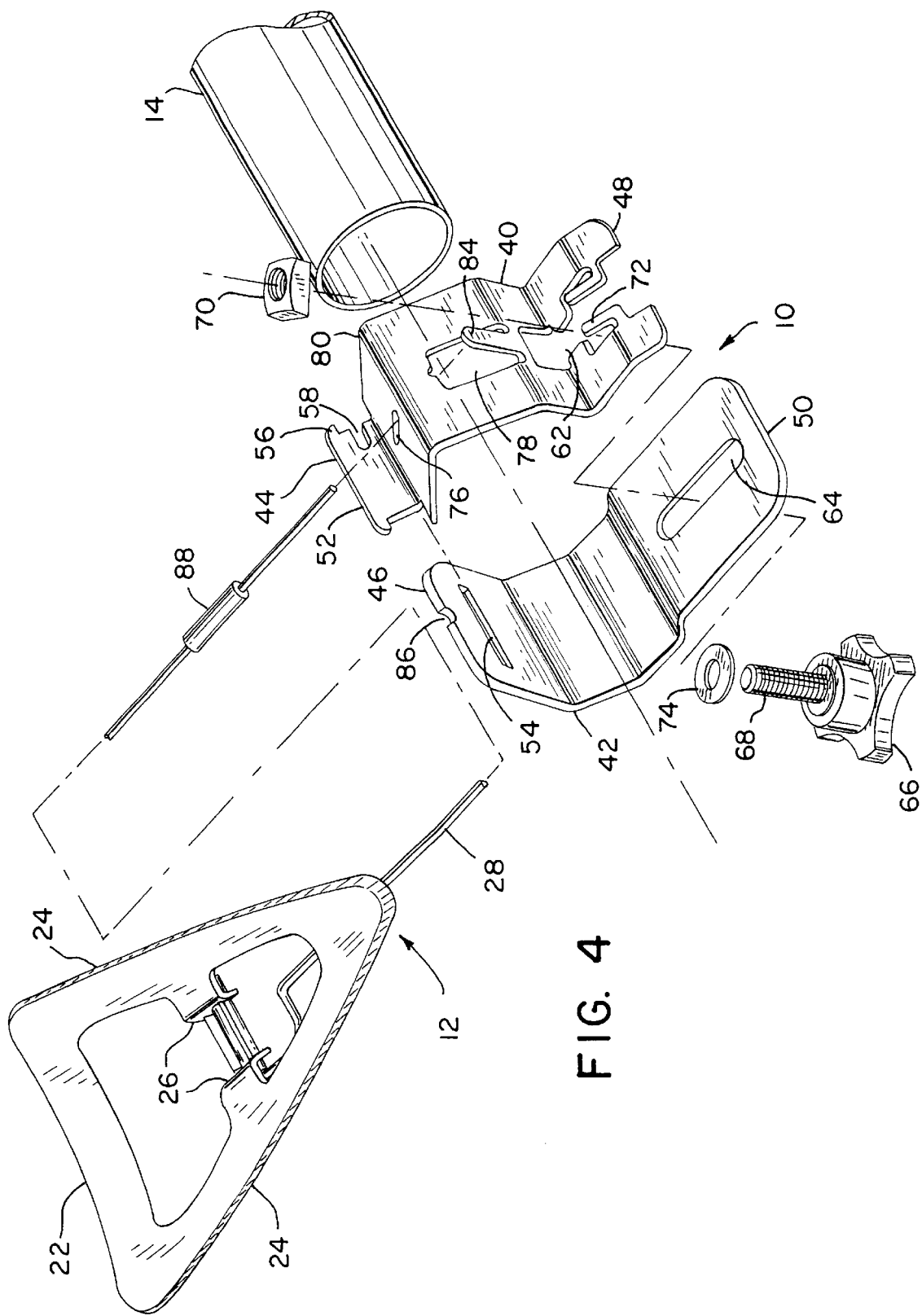
FIG. 4 is an exploded perspective view of an exemplary snipper knife assembly and holder in accordance with the present invention.

An exemplary knife assembly holder 10 in accordance with the present invention will now be described in more detail with reference to FIGS. 3 and 4. A knife assembly holder 10 in accordance with the present invention includes two plate members 40 and 42. Each of the first and second plate members 40 and 42 has a first end 44 and 46 and a second end 48 and 50, respectively. Structures are formed at the first ends 44 and 46 of the first 40 and second 42 plate members which allow the first 40 and second 42 plate members to be joined together moveably at the first ends 44 and 46, thereof. For example, the first ends 44 and 46 of the first 40 and second 42 plate members may be joined together in a moveable hinged relation by providing a tab 52 formed extending from the first end 44 of the first plate member 40, with a corresponding slot 54 formed on the first end 46 of the second plate member 42. The tab 52 may, for example, be formed to include extensions 56 formed at the distal end thereof, which prevent the tab 52 from falling out of the slot 54 when inserted therein, and a notch 58 formed therein, which facilitates inserting the tab 52 into the slot 54 and purposefully removing it therefrom. As illustrated in FIG. 3, by inserting the tab 52 into the slot 54, the two plate members 40 and 42 are joined together by a moveable hinge structure at the first ends 44 and 46 thereof, about which the plate members 40 and 42 may be closed, or separated (as illustrated by the dashed line in FIG. 3). It should be noted that different or more complicated hinge or other structures may be employed for moveably joining the first 40 and second 42 plate members together at the first ends 44 and 46 thereof.

The first 40 and second 42 plate members are sized and shaped such that, when the plate members 40 and 42 are closed together at the hinge structure around a mounting rod 14, or similar structure, an inner surface of each of the plate members 40 and 42 contacts an outer surface of the mounting rod at a plurality of contact points 60. When thus loosely closed around the mounting rod 14, the second ends 48 and 50 of the first 40 and second 42 plate members are brought closely adjacent to each other.

In accordance with the present invention, a tightening structure is formed at the second ends 48 and 50 of the plate members 40 and 42 which allows the second ends 48 and 50 of the plate members 40 and 42 to be brought together forcefully. For example, aligned apertures 62 and 64 may be formed through the second ends 48 and 50 of the first 40 and second 42 plate members, respectively. A hand turnable threaded knob 66, with a threaded shaft 68 formed thereon, may be extended through the aligned tightening structure apertures 62 and 64 formed in the second ends 48 and 50 of the plate members 40 and 42. A threaded nut 70, or other similar structure, is provided on the opposite end of the threaded shaft 68 from the hand turnable knob 66, such that the second ends 48 and 50 of the first 40 and second 42 plate members are disposed between the threaded nut 70 and the hand turnable knob 66. Projections 72, or other, similar, structures may be provided on the plate member 40 against which the threaded nut 70 rests, thereby to prevent rotation of the nut 70 when the hand turnable knob 66 is rotated to thread the threaded shaft 68 into the central aperture of the nut 70. A washer 74 may be provided around the threaded shaft 68, and positioned between the hand turnable knob 66 and the portion of the elongated plate member 42 against which the hand turnable knob 66 is positioned. The washer 74 reduces friction and wear, thereby facilitating hand rotation of the knob 66. The hand turnable knob 66 tightening structure allows a knife assembly holder 10 in accordance with the present invention to be mounted on a mounting rod 14, and adjusted in position thereon, without the use of any tools. A more conventional tightening structure, such as a bolt and nut structure without a hand turnable knob, which requires the use of one or more tools, may also, however, be employed.

The knife assembly 12 is mounted on the knife assembly holder 10 by providing two corresponding knife rod apertures 76 and 78 through one of the plate members 40. As illustrated in FIGS. 3 and 4, the knife rod apertures 76 and 78 may be formed on opposite sides of a bend 80 formed in one of the plate members 40. The knife rod apertures 76 and 78 are shaped and positioned on the plate member 40 on either side of the bend 80 therein, such that, when the knife assembly holder 10 is positioned around the mounting rod 14, and the end of the knife rod 28 is extended through the knife rod apertures 76 and 78, the knife rod extends in a direction perpendicular to the axis of the mounting rod 14, and is held in a position by the knife rod apertures 76 and 78 such that a portion of the knife rod is positioned adjacent to the surface of the mounting rod 14 at a contact point 82.

A knife rod stop 84, such as an extending tab, or other structure, may be formed on the plate member 40 in which the knife rod aperture 76 and 78 are formed. The knife rod stop 84 limits the extent to which the knife rod 28 may be extended through the knife rod apertures 76 and 78. The length of the knife rod 28 and the position of the knife rod stop 84 are selected such that, when the knife assembly 12 is mounted in position on the mounting rod 14 by the knife assembly holder 10, with the end of the knife rod 28 abutted against the knife rod stop 84, the knife head 12 is positioned in a desired position against the outer surface of the bean snipper drum 16.

A circular, v-shaped, or other shaped notch 86 may be formed in a portion of one of the plate members 42 which is extended to support the knife rod 28 along a portion of the length thereof on the opposite side of the mounting rod 14 from the knife rod stop 84. A sleeve 88, e.g., made of a plastic material, may be placed around the knife rod 28 at the location thereof which rests in the support notch 86.

A knife assembly holder 10 in accordance with the present invention provides for both securing the knife assembly holder 10 to a mounting rod 14 and supporting the knife rod 28 of the knife assembly 12 to the holder 10 (and thus to the mounting rod 14) by operation of a single tightening structure, such as a single hand turnable threaded knob 66. For example, as the hand turnable threaded knob 66 is rotated, to tighten the threaded shaft 68 into, e.g., the nut 70, the second ends 48 and 50 of the elongated plate members 40 and 42 are brought together tightly. This pinches the plate members 40 and 42 tightly against the mounting rod 14 at the contact points 60 between the plate members 40 and 42 and the mounting rod 14, thereby to mount the knife assembly holder 10 securely to the mounting rod 14. Simultaneously, drawing the second ends 48 and 50 of the elongated plate members 40 and 42 together also pulls the portion of the knife rod 28 extending between the knife rod apertures 76 and 78 toward the mounting rod 14, to pinch the knife rod 28 tightly between one of the plate members 40 and the mounting rod 14 at the contact point 82, thereby also to secure the knife rod 28, and, therefore, the entire knife assembly 12, securely in position.

The present invention thus provides a knife assembly holder which is quickly and easily operable to mount a knife assembly 12 to a mounting rod 14, to adjust the position of a knife assembly mounted thereon, and to remove and replace a knife assembly therefrom. To mount a knife assembly 12 to a mounting rod 14, the first 40 and second 42 plate members are first joined together at the first 44 and 46 ends thereof, e.g., by inserting a tab 52 formed at the first end 44 of the first plate member 40 into a slot 54 formed at the first end 46 of the second plate member 42, thereby to join the first 40 and second 42 plate members together in a moveable hinged relation. The first 40 and second 42 plate members are then closed together at the joined first 44 and 46 ends thereof around the mounting rod 14, such that interior surfaces of the first 40 and second 42 plate members contact the mounting rod 14 at a plurality of contact points 60, and the second 48 and 50 ends of the first 40 and second 42 plate members are brought together. The threaded shaft 68 of the hand turnable threaded knob 66 is then extended through the corresponding apertures 62 and 64 in the plate members 40 and 42. The threaded end of the threaded shaft 68 may be threaded, e.g., into the central aperture of a threaded nut 70 or other structure, thereby capturing the second ends 48 and 50 of the plate members 40 and 42 between the threaded nut 70 or other structure and the hand turnable knob 66. Before tightening the hand turnable knob 66, the end of a knife rod 28 of a knife assembly 12 is inserted through the knife rod apertures 76 and 78 formed in one of the plate members 40, such that a portion of the knife rod 28 positioned between the knife rod apertures 76 and 78 is positioned adjacent the mounting rod 14 at a contact point 82, and the end of the knife rod 28 is abutted against the knife rod stop 84. Thereafter, the hand rotatable knob 66 is rotated, to tighten the tightening structure, thereby bringing the second ends 48 and 50 of the plate members 40 and 42 together forcefully, thereby tightening the plate members 40 and 42 at the contact points 60 against the external surface of the mounting rod 14, while simultaneously pinching the knife rod 28 between the plate member 40 and the mounting rod 14, thereby holding both the knife assembly holder 10 and the knife assembly 12 in position.

The knife assembly holder 10 may be loosened, as desired, by loosening the tightening structure, e.g., to replace a worn knife assembly 12 or to adjust the position thereof, e.g., by changing the position of the knife assembly holder 10 on the mounting rod 14 to adjust the amount of pressure of the knife edges formed on the knife head 22 against the periphery of, e.g., a bean snipper drum 16. The knife assembly 12 and knife assembly holder 10 may be easily removed from the mounting rod 14 by unthreading the hand rotatable knob 66 from the nut 70, removing the knife rod 28 from the knife rod apertures 76 and 78, and separating the second ends 48 and 50 of the elongated plate members 40 and 42 from each other sufficiently to allow the plate members 40 and 42 to be removed from the mounting rod 14.

It has been found that a knife assembly holder in accordance with the present invention may be used to mount a new knife assembly 12 onto a support rod 14 in about 30 seconds, (without the use of tools using a hand turnable knob tightening structure). Prior art knife assembly holders require the use of several tightening structures (e.g., fasteners) to mount a knife assembly to the holder and the holder to a mounting rod, and can require 3½ to 4 or more minutes to properly mount and adjust the position of a knife assembly 12 on a mounting rod 14.

It should be noted that the present invention is not limited to the particular exemplary applications and embodiments illustrated and described herein, but embraces all such modified forms thereof as come within the scope of the following claims. In particular, it should be noted that the present invention is not limited to a knife assembly holder formed of plate members having the specific shapes illustrated and described herein. Although the plate members 40 and 42 described herein are shown as being formed as single pieces of material (e.g., steel) which are bent or otherwise formed (e.g., cast) in the desired shape, such plate members may be formed from any appropriate material and in several pieces which are adhered together in any manner to form the desired shape.

What is claimed is:

1. A knife assembly holder for attaching a knife assembly to a knife assembly mounting rod, comprising:
   (a) a first plate member having a first end and a second end;
   (b) a second plate member having a first end and a second end, wherein the first and second plate members are sized and shaped such that when the first ends of the first and second plate members are brought into proximity to each other and the second ends of the first and second plate members are brought into proximity to each other the first and second plate members form an opening sized and shaped to fit around the mounting rod; and
   (c) a knife rod stop formed on a one of the first or second plate members and positioned to contact an abutted end of a knife rod of the knife assembly attached to the first plate member to position the knife assembly in a desired position with respect to the knife assembly holder.

2. The knife assembly holder of claim 1 wherein the knife rod stop is formed as a tab extending from the first plate member perpendicular to the knife rod.

3. The knife assembly holder of claim 2 wherein the knife rod stop is formed as a tab extending from adjacent a second end of the first plate member.

4. The knife assembly holder of claim 1 comprising additionally means for attaching the knife rod of the knife rod assembly to the first plate member with the end of the knife rod abutted against the knife rod stop.

5. The knife assembly holder of claim 4 wherein the means for attaching the knife rod of the knife rod assembly to the first plate member includes knife rod apertures formed in the first plate member.

6. The knife assembly holder of claim 1 wherein the first end of the first plate member is moveably joined to the first end of the second plate member.

7. The knife assembly holder of claim 6 wherein the first end of the first plate member is moveably joined to the first end of the second plate member by a hinge structure formed on the first ends of the first and second plate members.

8. A method for attaching a knife assembly to a knife assembly mounting rod, comprising the steps of:
   (a) positioning a knife assembly holder around the mounting rod, wherein the knife assembly holder includes a first plate member having a first end and a second end, a second plate member having a first end and a second end, wherein the first and second plate members are sized and shaped such that when the first ends of the first and second plate members are brought into proximity to each other and the second ends of the first and second plate members are brought into proximity to each other the first and second plate members form an opening sized and shaped to fit around the mounting rod, and a knife rod stop formed on a one of the first or second plate members; and
   (b) attaching a knife rod of the knife assembly to the first plate member with an end of the knife rod abutted against the knife rod stop to position the knife assembly in a desired position with respect to the knife assembly holder.

9. The method of claim 8 wherein the knife rod stop is formed as a tab extending from the first plate member perpendicular to the knife rod.

10. The method of claim 8 wherein the first end of the first plate member is moveably joined to the first end of the second plate member and wherein the step of positioning the knife assembly holder around the mounting rod includes the step of closing the first and second plate members around the mounting rod about a hinge structure formed on the first ends of the first and second plate members.

11. The method of claim 8 wherein the step of attaching a knife rod of the knife assembly to the first plate member includes the steps of inserting the knife rod through knife rod apertures formed in the first plate member and abutting an end of the knife rod against a knife rod stop formed on the first plate member to limit an extant to which the knife assembly rod may be extended through the knife rod apertures formed in the first plate member.

* * * * *